United States Patent
Peters et al.

(10) Patent No.: US 11,040,913 B1
(45) Date of Patent: Jun. 22, 2021

(54) CERAMIC-METALLIC COMPOSITES DEVOID OF POROSITY AND THEIR METHODS OF MANUFACTURE

(71) Applicant: FIRELINE, INC., Youngstown, OH (US)

(72) Inventors: Klaus-Markus Peters, Boardman, OH (US); Brian Paul Hetzel, Boardman, OH (US); Walter Ray Whitman, Salem, OH (US)

(73) Assignee: Fireline, Inc.

( * ) Notice: Subject to any disclaimer, the term of this patent is extended or adjusted under 35 U.S.C. 154(b) by 0 days.

(21) Appl. No.: 16/993,617

(22) Filed: Aug. 14, 2020

(51) Int. Cl.
| | |
|---|---|
| *B22D 18/00* | (2006.01) |
| *B22D 18/04* | (2006.01) |
| *B22D 19/00* | (2006.01) |
| *C04B 35/10* | (2006.01) |
| *C04B 35/657* | (2006.01) |
| *C04B 35/65* | (2006.01) |
| *C22C 29/06* | (2006.01) |
| *C22C 29/12* | (2006.01) |
| *C22C 21/02* | (2006.01) |

(52) U.S. Cl.
CPC ............ *C04B 35/10* (2013.01); *C04B 35/652* (2013.01); *C04B 35/657* (2013.01); *C22C 29/065* (2013.01); *C22C 29/12* (2013.01); *C04B 2235/3217* (2013.01); *C04B 2235/3418* (2013.01); *C04B 2235/402* (2013.01); *C04B 2235/405* (2013.01); *C04B 2235/408* (2013.01); *C04B 2235/6581* (2013.01); *C22C 21/02* (2013.01)

(58) Field of Classification Search
CPC ........ B22D 18/00; B22D 18/04; B22D 18/06; B22D 19/00; B22D 19/14
USPC ......... 164/61, 62, 65, 66.1, 67.1, 91, 97, 98, 164/112
See application file for complete search history.

(56) References Cited

U.S. PATENT DOCUMENTS

| | | | |
|---|---|---|---|
| 2,702,750 A | 2/1955 | George | |
| 4,713,360 A | 12/1987 | Newkirk | |
| 5,031,444 A * | 7/1991 | Doutre et al. | G01N 33/2025 73/19.07 |
| 5,214,011 A | 5/1993 | Breslin | |
| 5,333,667 A * | 8/1994 | Louat et al. | B22D 19/14 164/97 |
| 5,394,930 A * | 3/1995 | Kennerknecht | B22D 19/14 164/112 |

(Continued)

OTHER PUBLICATIONS

J.R. Davis, ASM Specialty Handbook: Aluminum and Aluminum Alloys, 1993.

(Continued)

*Primary Examiner* — Kevin P Kerns
(74) *Attorney, Agent, or Firm* — H. Jay Spiegel (57) ABSTRACT

Ceramic-metallic composites are disclosed along with the equipment and processes for their manufacture. The present invention improves the densities of these composites by eliminating porosity through the use of a unique furnace system that applies vacuum and positive gas pressure during specific stages of processing. In the fabrication of $Al_2O_3$—Al composites, each process commences with a preform initially composed of at least 5% by weight silicon dioxide, and the finished product includes aluminum oxide and aluminum, and possibly other substances.

21 Claims, 7 Drawing Sheets

(56) References Cited

U.S. PATENT DOCUMENTS

| | | | |
|---|---|---|---|
| 5,728,638 A | 3/1998 | Strange et al. | |
| 5,899,256 A * | 5/1999 | Rohatgi | B22D 19/14 164/97 |
| 6,125,914 A * | 10/2000 | Billaud et al. | B22D 18/04 164/119 |
| 7,267,882 B2 | 9/2007 | Breslin et al. | |

OTHER PUBLICATIONS

G. M. LaVecchia, C. Badini, D. Puppo, F.D'Errico: Co-continuous Al/Al2O3 composite produced by liquid displacement reaction, 2003.

Kyle Myers: Structure-Property Relationship of Binder Jetted Fused Silica Preforms to Manufacture Ceramic-Metallic Interpenetrating etc., 2016.

G.S. Daehn and M.C. Breslin: Co-Continuous Composite Materials for Friction and Braking Applications, 2006.

\* cited by examiner

CERAMIC-METALLIC COMPOSITES DEVOID OF POROSITY AND THEIR METHODS OF MANUFACTURE

BACKGROUND OF THE INVENTION

The present invention consists of embodiments of ceramic-metallic composites devoid of porosity and their methods of manufacture. Ceramic-metallic composites, particularly, those including aluminum and aluminum compounds as constituent ingredients, have numerous applications. These include use in brake components including brake rotors, degassing rotors, riser tubes, dies and molds, heater immersion tubes, thermocouple protection tubes, ladles, stirring devices, bearings, nozzles, bushings, valve components, clutches, engine components, turbine components, electrical conductors, heat sinks, thermal diffusers, metal working dies, cutting tools, components of sporting goods such as golf club heads and ice skating blades, impellers, and others.

However, applicants have found that ceramic-metallic composite materials containing aluminum have inherent issues with porosity that are generated during processing. This porosity has a significant negative impact on the properties of the composites, particularly their strength, which limits the usefulness of the materials. As such, an important object of the present invention is to significantly reduce or eliminate the porosity and thereby increase the density and improve the material properties.

As described in greater detail hereinafter, this object is achieved by creating ceramic-metallic composites in which the porosity is significantly reduced (and the density significantly increased) by utilizing a special apparatus that applies negative pressures (also referred to as a vacuum) and positive inert gas pressures to reduce or eliminate porosity in the final composite material.

The embodiments of the present invention are improvements over the inventions described in U.S. Pat. Nos. 5,214,011; 5,728,638; and 7,267,882. A preferred embodiment from those three prior art patents involves the following two major process steps:

1. A preform shape containing a sacrificial oxide ceramic, typically silicon dioxide ($SiO_2$), is conventionally fabricated. This preform shape may be totally comprised of that sacrificial oxide or also include inert ceramic additives, typically silicon carbide (SiC). Also, the preform shape may be porous or it may be completely solid with no internal void spaces (also referred to as pores).

2. The preform shape is preheated in one furnace to an operating temperature generally between about 1000 to 1250° C., then fully immersed in a liquid aluminum (Al) bath held inside a second furnace already at that same temperature range, then finally extracted from the bath upon completion of processing. The resulting shape retains the original dimensions of the preform shape but during immersion the preform material is transformed into a ceramic-metallic composite material. The aluminum bath may be pure or it may contain trace impurities, inert alloying elements, or (when SiC is present in the preform) 20 to 30 weight % silicon (Si) to totally suppress any reaction between the SiC and Al. The second furnace is comprised of a lower section that holds the liquid aluminum and a top section that contains the heating system; the top section is moved out of the way when it is time to immerse or extract the shape from the bath. An inert gas such as argon at atmospheric pressure is flowed into this furnace in order to protect the liquid aluminum from excessive oxidation.

While the preform is immersed, the sacrificial oxide reacts with the aluminum via a displacement reaction. The following reaction takes place when silicon dioxide is utilized: $4Al+3SiO_2=2Al_2O_3+3Si$. The shape is held in the liquid aluminum bath long enough for the displacement reaction to go to completion and all of the sacrificial oxide converted over to aluminum oxide ($Al_2O_3$). Upon completion of the reaction, the shape is removed from the liquid aluminum bath. If no silicon was initially in the bath then the silicon yielded from this reaction will be significantly diluted, yielding a composite of $Al_2O_3$—Al. If the preform contains silicon carbide, then a $Al_2O_3$—Al—Si—SiC composite results. If the starting preform shape contained internal void spaces, then the weight of aluminum and silicon in the final composite will depend upon the amount of porosity in the original preform and how well that void space was filled with the aluminum alloy during processing.

Applicants currently use this preferred embodiment to manufacture composites sold under the TCON® trademark. Applicants also use the term "transformation process" to describe their manufacturing methods of carrying out displacement reactions in a liquid metal bath.

Figure 1:
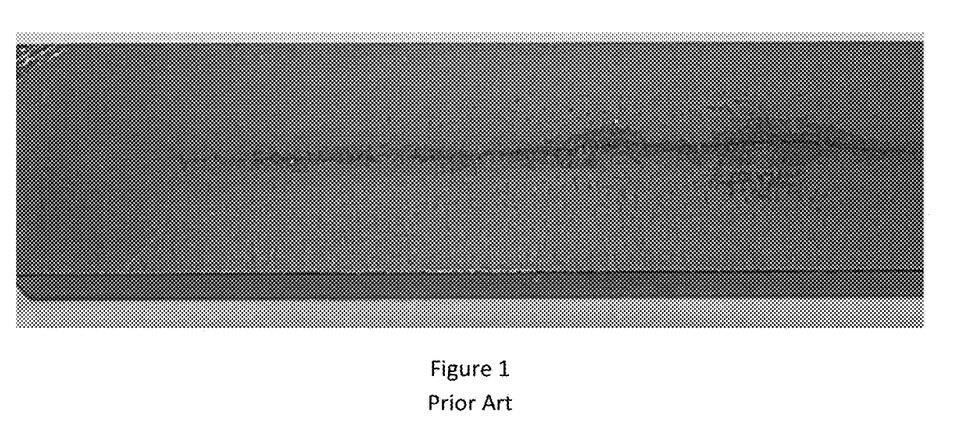
FIG. 1 is an optical photograph at 5× magnification of a prior art cross-sectioned test bar showing centerline porosity.

In addition to producing unique materials with useful properties, this transformation process has the ability to produce net or near-net useful shapes, which is an economical advantage over other competing processes. By using common manufacturing techniques to fabricate the preform into a net shape, the transformation process retains those features, thereby eliminating or significantly reducing any cutting or grinding necessary to utilize the final shape. Therefore, these ceramic-metallic composites produced from this prior art have a variety of useful properties and can be formed into net or near-net useful shapes for a variety of applications. However, material flaws in the final composite such as voids (measured as porosity) will limit these properties and the greater the porosity the more the properties are negatively affected. The applicants have discovered that following the preferred embodiment from the three prior art patents will consistently result in porosity that is concentrated in the center region of the ceramic-metallic shapes. This is referred to more commonly as centerline porosity as a result of how it appears on a cross-sectioned sample as shown in FIG. 1. Further investigation discovered that this porosity is concentrated in the free aluminum phase of the composites.

The present invention is a result of the research into the root causes of porosity in these ceramic-metallic composite shapes as well as the development of novel processing methods to eliminate these flaws, thereby maximizing the properties. It was determined that centerline porosity was due to a combination of three factors: 1) dissolved hydrogen gas; 2) shrinkage of liquid aluminum during solidification; and 3) how heat dissipates from the composite shape after it is extracted from the aluminum bath at the end of the transformation process. As liquid aluminum solidifies it undergoes considerable shrinkage while at the same time hydrogen gas is expelled, both of which generate porosity in the solid aluminum phase. The third factor is a direct result of how the preferred embodiment from the three prior art patents is carried out: the outside surfaces of the composite shape cool first and the center section is the last to cool, which concentrates the shrinkage and gas porosity in the center, forming centerline porosity.

Hydrogen gas is highly soluble in liquid aluminum and the primary source of hydrogen is the reaction of water moisture in the air reacting with liquid aluminum through the following reaction: $3H_2O+2Al=Al_2O_3+6H$. This phenomenon occurs in both pure aluminum as well as aluminum alloyed with other constituents. The solubility of hydrogen increases as the temperature of aluminum increases: for example, the solubility of hydrogen in liquid pure aluminum at 660° C. is 0.65 mL of hydrogen per 100 g of aluminum versus 3 mL/100 g at 900° C. Furthermore, the solubility of hydrogen in pure aluminum drops significantly as the metal solidifies: at 660° C. the solubility at liquid aluminum is 0.65 mL/100 g but only 0.034 mL/100 g when the aluminum has solidified. Subsequently, hydrogen gas is expelled from liquid aluminum as it cools and then generates porosity as the metal solidifies. The effect of porosity generated by dissolved hydrogen upon the mechanical properties of aluminum is significant. As an example, a 356 aluminum alloy containing about 0 dissolved hydrogen will have a tensile strength of 41,000 psi, while the same alloy containing 0.27 mL/100 g dissolved hydrogen at casting will have a strength of 35,000 psi, a loss of 15%.

The problems associated with hydrogen solubility in liquid aluminum, the subsequent porosity generated in solid aluminum, as well as techniques to mitigate or eliminate this porosity are well documented in the prior art. In the field of aluminum and aluminum alloy metal casting there are several techniques used throughout industry. Gas purging is the most extensively used technique, whereby an inert gas (e.g., argon) or inert-reactive gas mixture (e.g., argon+ chlorine) is bubbled through the liquid aluminum and the dissolved hydrogen is carried out of the liquid. Applying a vacuum to liquid aluminum is also known to work but is not utilized by metal casting manufacturers to any great extent.

The second source of porosity in ceramic-metallic composites is caused by shrinkage during solidification, and the impact of this type of porosity is much more significant than porosity caused by dissolved hydrogen. As liquid aluminum and aluminum alloys go through cooling and solidification there is a significant increase in the material density; in other words, as the liquid solidifies there is a significant volumetric decrease, also called shrinkage. If this shrinkage is not compensated for during solidification then the solid metal will contain porosity. The majority of volumetric contraction occurs at the melting point: the melting point of pure aluminum is 660° C. and as liquid aluminum solidifies at that temperature the density increases from 2.368 g/cm$^3$ to 2.548 g/cm$^3$, which results in a 7.1% volumetric contraction. Aluminum alloys also experience volumetric shrinkage during solidification: this can range from 3.5 to 8.5% depending upon the alloying elements. Again, this would result in that an equal amount of porosity if that volume contraction is not backfilled with more aluminum. If the porosity is severe enough the mechanical properties of the solid metal will be negatively affected. As an example, as the porosity in a 319 aluminum casting alloy is increased from about 0 to 5 volume percent the tensile strength is reduced by over 50% (from 225,000 psi to less than 100,000 psi) and the metal becomes more brittle.

The phenomena of shrinkage porosity in the casting of aluminum and aluminum alloys is also well documented in the prior art. The primary technique used to reduce or eliminate porosity in aluminum castings is through the use of risers. Metal castings are produced by pouring liquid metal into a mold, and the riser is a reservoir of liquid designed to solidify last after the casting has fully solidified in the mold; as the liquid metal in the mold cavity solidifies and shrinks, liquid is drawn from the riser to compensate for the shrinkage. Additional techniques utilize mold materials and designs that affect how the liquid metal solidifies within a mold in order to eliminate porosity resulting from solidification shrinkage. However, these techniques are not practical for ceramic-metallic composites produced by following the preferred embodiment of the prior art patents because the process does not utilize any type of mold while the displacement reaction is carried out.

Finally, the location of the shrinkage porosity is a direct result of following the preferred embodiment from the three prior art patents. As previously discussed, a preform shape containing a sacrificial oxide ceramic is fully immersed into a liquid aluminum bath held at about 1000 to 1250° C. and upon completion of the displacement reaction the shape is extracted from the bath. Initially the final ceramic-metallic composite shape comes out of the bath at a uniform temperature equal to the temperature of the liquid aluminum bath but the outside surfaces immediately begin to cool. Because the shape is free standing the residual heat continually dissipates from the outside surfaces and creates a temperature gradient whereby the regions closest to the outside surfaces are cooler than the region in the center of the shape. As the temperature drops to the aluminum solidification temperature (e.g., 660° C. for pure aluminum, 577° C. for aluminum-silicon alloys) the aluminum in regions closest to the outside surfaces will solidify first and the subsequent shrinkage will be backfilled by liquid aluminum in the center of the shape. This continues on as cooling proceeds until all of the aluminum in the composite shape has completely solidified. However, centerline porosity has formed because it is the last region of aluminum to solidify and there is no ability to backfill this porosity with additional aluminum. As an example, FIG. 1 shows the centerline porosity that has formed in a test bar that was processed by following the preferred embodiment from the three prior art patents.

The following prior art is known to Applicants:

Formation of Lanxide™ Ceramic Composite Materials by Newkirk, et al. (*Journal of Materials Research*, Vol. 1, Issue 1, February 1986, page 81-89) describes the Lanxide DIMOX (directed metal oxidation) processes for preparing ceramic-metal composites. This fabrication technique utilizes a vapor-phase transport process and involves the oxidation of a bulk liquid metal by a gas to produce ceramic-metal composites, such as aluminum oxide ($Al_2O_3$)-aluminum (Al) ceramic-metallic composites.

U.S. Pat. No. 4,713,360 to Newkirk also discloses preferred embodiments of the Lanxide DIMOX (directed metal oxidation) processes.

U.S. Pat. No. 2,702,750 to George discloses methods of fabricating aluminum oxide ($Al_2O_3$)-aluminum (Al) ceramic-metallic composites produced by displacement reactions in a liquid metal Al bath at preferred temperatures of 700 to 900° C. The present invention differs from the teachings of George in that the inventive process is carried out at temperatures significantly higher than that of George (typically 1000 to 1200° C.). However, composites produced by following the preferred embodiments of this patent would also suffer from centerline porosity due to aluminum shrinkage during solidification.

U.S. Pat. No. 5,214,011 to Breslin discloses methods of fabricating aluminum oxide ($Al_2O_3$)-aluminum (Al) ceramic-metallic composites produced by displacement reactions in a liquid metal bath at preferred temperatures of at least 300° C. above the melting point of aluminum (Al) (660° C.). The processes disclosed in this patent are carried out at 960° C. and higher.

U.S. Pat. No. 5,728,638 to Strange discloses improvements on the inventions disclosed in Breslin '011 by incorporating inert metal additives that result in property improvements.

U.S. Pat. No. 7,267,882 to Breslin discloses improvements on the invention disclosed in Breslin '011 by incorporating inert ceramic additives such as silicon carbide that result in property improvements.

Breslin '011, Strange '638, and Breslin '882 all discuss methods of fabricating ceramic-metallic composites using shapes containing sacrificial oxides, commonly called a transformation process. While Breslin '011 and Strange '638 are focused on $Al_2O_3$—Al composites and Breslin '882 is focused on $Al_2O_3$—Al—SiC composites, none of them recognize that the free aluminum or aluminum alloys in these composites have a strong propensity to form porosity as the composite material is processed, and that this porosity is a significant limiting factor in how the composites may be utilized in highly stressed applications. Furthermore, by following the embodiments of these prior art patents, the resulting ceramic-metallic composites will have centerline porosity and the subsequent negative effects on the material properties as described above.

*Co-continuous Al/$Al_2O_3$ composite produced by liquid displacement reaction: Relationship between microstructure and mechanical behavior*, by G. M LaVecchia, C. Badini, D. Puppo, F. D'Errico, 2003. These researchers carried out experiments on ceramic-metallic composites produced by following the preferred embodiments in Breslin '011, specifically the transformation of silicon dioxide preforms (in the form of fused quartz glass) in a bath of liquid metal comprised of either pure aluminum or an alloy of aluminum plus 10% silicon. In all samples fabricated the researchers found residual porosity in the final composite, up to 1.7 volume %. Furthermore, the researchers document how this porosity negatively affected the mechanical properties of the composites, such as poor tensile strength, and also caused scattering of the test results. This reference documents the issues Applicants' assignee has experienced carrying out the preferred embodiments of the Breslin patents.

*Structure-Property Relationship of Binder Jetted Fused Silica Preforms to Manufacture Ceramic-Metallic Interpenetrating Phase Composites*, by Kyle Myers, 2016. This researcher carried out experiments on ceramic-metallic composites produced by following the preferred embodiments in Breslin '011, specifically by fabricating silicon dioxide preforms through additive manufacturing (also known as 3D printing) followed by transformation in a bath of liquid metal comprised of pure aluminum. Porosity was found in all the composite samples fabricated by this researcher, and he documents how this porosity negatively affects physical properties such as strength and stiffness. An attempt was made to utilize hot isostatic pressing (HIP) as a post-processing technique, but this did not remove all of the porosity in the composite samples. The researcher also attempted to utilize a vacuum and inert gas pressure (3.45 MPa) during a transformation process but those samples still contained porosity. This reference documents the issues Applicants' assignee has experienced carrying out the preferred embodiments of the Breslin patents, and also supports that utilizing vacuum and pressure to create ceramic-metallic composites devoid of porosity is a patentable invention.

*Co-Continuous Composite Materials for Friction and Braking Applications*, by G. S. Daehn and M. C. Breslin, 2006. These researchers carried out experiments on ceramic-metallic composites produced by following the preferred embodiments in Breslin '011 and Breslin '882, specifically by fabricating preforms containing silicon dioxide plus silicon carbide followed by transformation in a bath of liquid metal comprised of aluminum plus 25% silicon. Small samples were tested in a bench-top friction pair apparatus and the results indicated that these ceramic-metallic composites are potential lightweight materials that could be useful as automotive brake rotors. However, it has been Applicants' assignee's experience that by following the preferred embodiments in Breslin '011 and Breslin '882, fabricating full size automotive brake rotors, and testing the rotor samples in a dynamometer that simulates automotive braking conditions, these automotive brake rotors fail the test because the physical properties are significantly reduced due to porosity.

The following prior art all disclose data relied upon to support Applicants' assertions regarding the improvements of the present invention:

*ASM Specialty Handbook: Aluminum and Aluminum Alloys*, Edited by J. R. Davis, 1993; *Metals Handbook Ninth Edition, Volume 15: Casting*, Edited by D. M. Stefanescu, 1988; *Metals Handbook Desk Edition*, Edited by H. E. Boyer and T. L. Gall, 1985; *Microstructure Development During Metalcasting*, by J. E. Gruzleski, 2000; and *Using Partial Pressure in Vacuum Furnaces*, by D. H Herring, published in Industrial Heating magazine, November 2005.

These books and article document the properties of aluminum and aluminum alloys, including the shrinkage of liquid aluminum as is solidifies, the solubility of hydrogen in liquid aluminum and how the gas forms porosity as the aluminum solidifies, how porosity negatively impacts the properties of aluminum and aluminum alloys, and the prior art for heat treating and vacuum processing.

SUMMARY OF THE INVENTION

The present invention consists of embodiments of ceramic-metallic composites devoid of porosity and their methods of manufacture. Ceramic-metallic composites containing aluminum or aluminum alloys are materials that have a variety of useful properties. However, by following the prior art processes these composites will contain porosity, which significantly reduces their properties and usefulness. The present invention includes the following objects, aspects and features:

(1) In order to address this problem, the present invention contemplates utilizing a unique furnace system to carry out the displacement reactions for the production of these ceramic-metallic composites, specifically aluminum oxide ($Al_2O_3$)-aluminum (Al) composites or aluminum oxide ($Al_2O_3$)-aluminum (Al)-silicon carbide (SiC) composites produced by displacement reactions in a liquid metal bath. Several embodiments of the present invention utilize a unique transformation furnace system that integrates a preheating system together with liquid metal bath that is held at temperatures of at least 900° C. and higher, all contained within a chamber capable of being fully evacuated as well as pressurized with an inert gas. This unique furnace system can be referred to as a Vacuum-Pressure-Transformation furnace or VPT furnace for short.

(2) These new methods are unobvious over existing technology reflected by the prior art discussed above, particularly the Breslin and Strange patents, that Applicants currently use to manufacture ceramic-metallic composites sold under the TCON® trademark.

(3) Displacement reactions between a metal and a sacrificial oxide will result in composites consisting of co-continuous ceramic-metal phases, and these materials have unique properties. Applicants' preferred method is to use a preform shape containing silicon dioxide ($SiO_2$) and to carry out these displacement reactions by fully immersing a preform into a bath of liquid aluminum; this method of carrying out displacement reactions is known as a "transformation" process. In order to avoid starving the reaction, it is best for the bath to contain more liquid metal than the required minimum. Also, the preform shape is held in the bath until all of the sacrificial oxide has been reacted.

(4) In one version of this process, the following reaction is utilized to produce aluminum oxide ceramic-aluminum metal ($Al_2O_3$—Al) based composites:

$$(4+x)Al+3SiO_2=2Al_2O_3+xAl+3[Si]_{Al}$$

Note that the silicon (Si) by-product dissolves into the liquid aluminum (Al); most of this flows into the Al bath, and some amount remains in the final composite material. This results in a material with a composition of 74 weight % $Al_2O_3$, 26 weight % Al, and a trace of the Si reaction by-product.

(5) In another version of this transformation process, silicon carbide (SiC) particles can be added to these $Al_2O_3$—Al based composites in order to affect the final properties, e.g., increasing the thermal shock resistance of the material. Under the right processing conditions, the SiC additive is inert and doesn't participate in the displacement reaction. More specifically, in order to prevent the SiC from reacting with the Al, the liquid aluminum bath contains excess Si in order to suppress the reaction $4Al+3SiC=Al_4C_3+3Si$. Subsequently, the reaction may be written as:

$$(4+x)Al+3SiO_2+y[Si]_{Al}+zSiC=2Al_2O_3+xAl+(3+y)[Si]_{Al}+zSiC$$

(6) The resulting material retains the basic $Al_2O_3$—Al structure, which bonds the SiC additives together. Regardless of whether or not the composite material contains silicon carbide, this transformation process is carried out at temperatures typically above 900° C. in order to form alpha aluminum oxide (a $Al_2O_3$) from the displacement reaction. Also, the resulting shape retains the original dimensions of the preform shape but during immersion the preform material is transformed into a ceramic-metallic composite material. Finally, all of these types of ceramic-metallic composites are being commercially produced by Applicants' Assignee Fireline, Inc. and sold under the ICON® trademark.

(7) As described earlier, the preferred embodiment from the Breslin '011, Strange '638, and Breslin '882 patents utilizes a preheat furnace and a separate transformation furnace containing the liquid aluminum. The preform shape is preheated in the first furnace to an operating temperature generally between about 1000 to 1250° C., then fully immersed in a liquid aluminum (Al) bath held inside a second furnace already at that same temperature range, then finally extracted from the bath upon completion of processing. The second furnace is comprised of a lower section that holds the liquid aluminum and a top section that contains the heating system; the top section is moved out of the way when it is time to immerse or extract the shape from the bath. An inert cover gas such as argon at atmospheric pressure is flowed into this furnace in order to protect the liquid aluminum from excessive oxidation. While the liquid aluminum bath can be degassed using conventional techniques documented in the prior art, thereby minimizing any hydrogen gas porosity, centerline porosity will still form because of how the composite shapes are cooled after being extracted out of the liquid metal bath. The Vacuum-Pressure-Transformation furnace is a unique furnace system that addresses both issues, resulting in ceramic-metallic composites which have essentially no porosity and optimal properties as a result.

Figure 2:
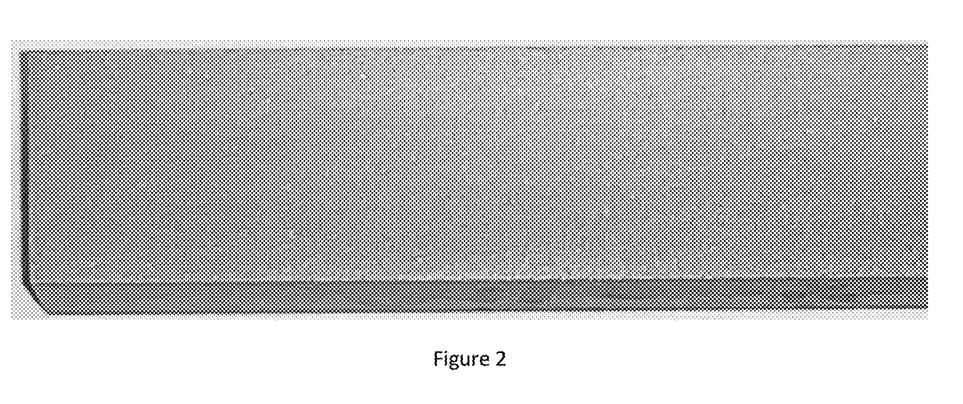
FIG. 2 is an optical photograph at 5× magnification of a cross-sectioned test bar made in accordance with the teachings of the present invention showing no centerline porosity.
Figure 3:
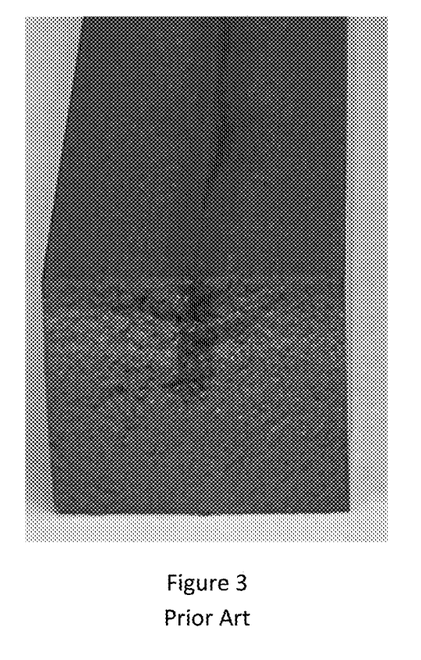
FIG. 3 is an optical photograph at 5× magnification of a prior art broken test bar showing centerline porosity.
Figure 4:
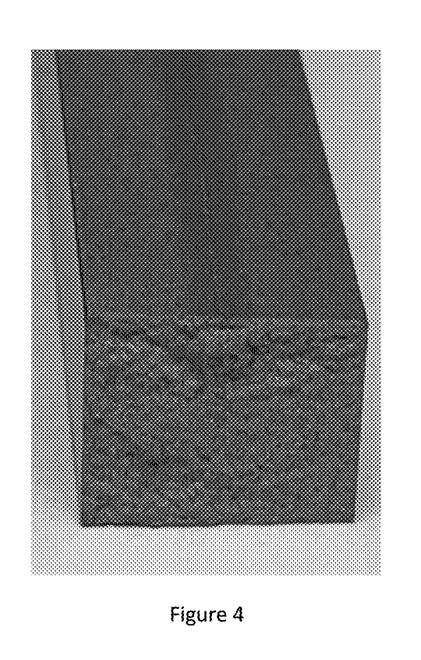
FIG. 4 is an optical photograph at 5× magnification of a broken test bar made in accordance with the teachings of the present invention showing no centerline porosity.

(8) FIGS. 2 and 4 show composites that were run through this Vacuum-Pressure-Transformation furnace and exhibit no centerline porosity, while FIGS. 1 and 3 show samples that were processed by following the prior art and exhibit centerline porosity.

(9) As previously described, the preferred embodiment from the Breslin '011, Strange '638, and Breslin '882 patents utilizes two separate furnace systems: the first is used to preheat the preform shape to an operating temperature generally between about 1000 to 1250° C., while the second furnace is comprised of a lower section that holds the liquid aluminum in that same temperature range and a top section that contains the heating system; the top section is moved out of the way when it is time to immerse or extract the shape from the bath. An inert cover gas such as argon at atmospheric pressure flows into this furnace in order to protect the liquid aluminum from excessive oxidation.

(10) The VPT furnace system is an improvement over these prior art furnace systems for a number of reasons: the shape preheating and transformation steps are carried out in one furnace system instead of two separate ones; using vacuum pressure to remove air and moisture is much more effective than utilizing an inert cover gas, which significantly increases the cleanliness of the liquid metal bath; using inert gas positive pressure eliminates the formation of centerline porosity in the final composite shape.

(11) Furthermore, another benefit of the Vacuum-Pressure-Transformation furnace was surprisingly discovered: the transformation reaction rate achieved is significantly higher as compared with the prior art. Breslin '011, Strange '638, and Breslin '882 all disclose that reaction rates of 1 to 3 mm/hour are achieved by following the preferred embodiments in those patents. The present invention has surprisingly achieved 8.5 mm/hour and higher for the same preform compositions, a nearly threefold improvement. As a result, utilizing the Vacuum-Pressure-Transformation furnace has a significant advantage as a manufacturing process because the shape throughput rate can be three times faster than the prior art.

(12) While the prior art patents disclose how negative and positive pressures may be used during processing of ceramic-metallic composites, they do so in different contexts than that disclosed by the present application. For example, Breslin '011 discloses the following in column 8 starting with line 52:

"Still another advantage of the present invention is the ability to run the reaction in an oxygen free environment such as an argon blanket, or Ar/H mix, or under a full or partial vacuum. Thus the present invention avoids undesirable side oxidation reactions which can occur in the Lanxide DIMOX process and other prior art processes."

The disclosure made by Breslin '011 is purely to contrast the uniqueness of that invention to other prior art whereby the presence of a significant amount of an oxidizing atmosphere is a requirement.

(13) Also, Breslin '882 discloses the following in column 4 starting with line 17:

"The process has been successfully completed at pressures between 5 psi above atmospheric pressure and about 5 micrometers Hg, absolute. The process has also been successfully completed in inert atmospheres. It is believed that the process may also be successfully completed at higher pressures; and; as discussed below;

the process and reaction are not dependent on forcing the liquid metal into pores in the preform. Because the preform is preferably submerged into the liquid metal; there is no atmosphere surrounding the reaction other than the liquid metal.";

as well as in column 5 starting with line 59:

"Conventional composite preparation techniques generally favor increased porosity to enable the metal to flow into the preform and maximize contact with the ceramic matrix, and, thus, need continuous porosity through the preform, so there is a flow path without restrictive pressure, or pockets may form that the liquid metal cannot penetrate. These processes often use positive or negative pressure to force the metal to flow into and through the pores. Unlike conventional composite formation, the aluminum in the present invention need not travel through pores in the ceramic to contact the reactants and porosity of the preform is disfavored in the present invention, because the formation of the composite is reaction-driven and not driven by filling of pores."

(14) These disclosures by Breslin '882 are made to contrast the uniqueness of that invention to other prior art whereby the presence of pores in a preform is a requirement along with utilizing negative and/or positive pressure to force liquid metal into the pores of that preform in order to fabricate ceramic-metallic composites. Applicants are in agreement with the Breslin '011, Strange '638, and Breslin '882 patents that the preferred embodiments from that prior art do not require vacuum or pressure to carry out the displacement reaction; the transformation process can successfully proceed on both solid or porous preform shapes without the requirement of vacuum or pressure. However, those prior art patents do not recognize how the formation of porosity in the final ceramic-metallic composites is inherently a part of those preferred embodiments; the present application provides a unique solution to that problem.

(15) Numerous potential industrial uses for these improved ceramic-metallic composites have been outlined in the prior art patents disclosed and discussed above. Applicants' Assignee Fireline, Inc.'s current product and market development focus is on automotive brake rotors, and the inventive composites offer significant performance improvements in that application.

As such, it is a first object of the present invention to provide ceramic-metallic composites devoid of porosity and methods of making them.

It is a further object of the present invention to provide such composites recognizing that the strength of the composite diminishes when porosity is present in the material.

It is a further object of the present invention to direct the improvements to ceramic-metallic composites specific to those incorporating aluminum oxide and aluminum produced by displacement reactions in a liquid metal bath, by utilizing a unique furnace called a Vacuum-Pressure-Transformation furnace.

It is a still further object of the present invention to not only provide such composites but to also disclose and claim their methods of manufacture.

These and other objects, aspects and features of the present invention will be better understood from the following detailed description of the preferred embodiments when read in conjunction with the appended drawing figures.

SPECIFIC DESCRIPTION OF THE PREFERRED EMBODIMENTS

Figure 5:
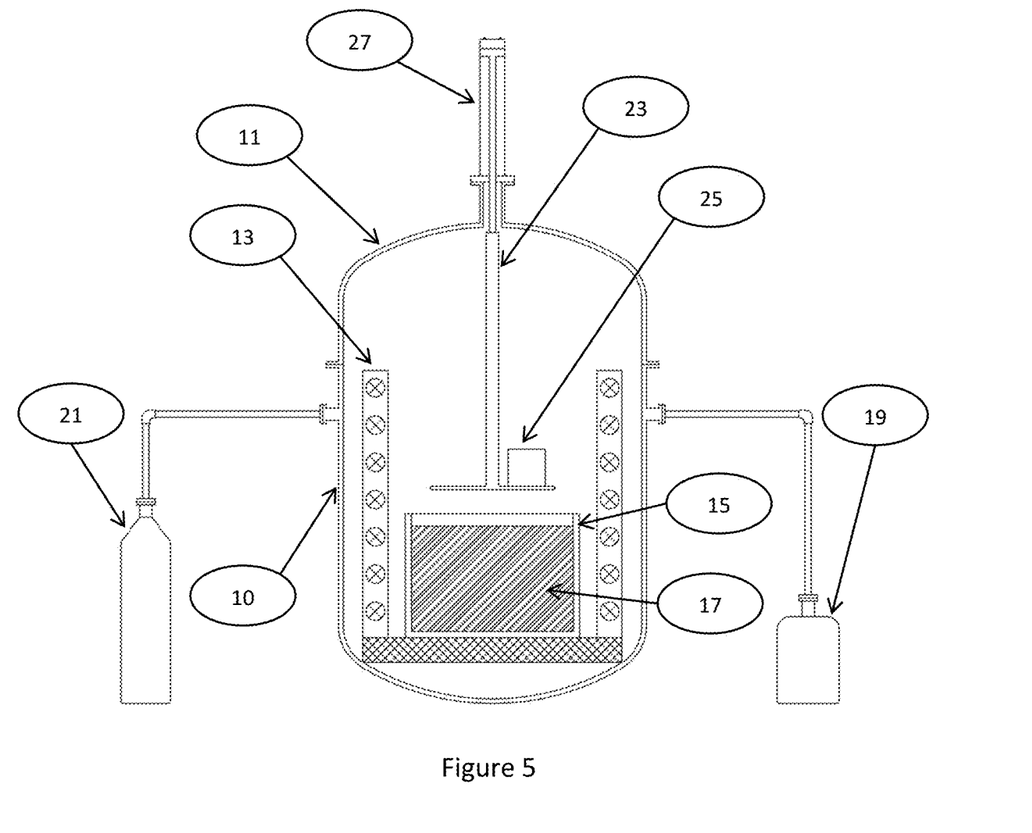
FIG. 5 is a cross-sectional drawing of a Vacuum-Pressure-Transformation furnace with a shape actuator, with the shape in the preheating position.

The Vacuum-Pressure-Transformation furnace is designed to carry out the transformation process and operates in two primary pressure conditions, either under negative pressure (i.e., vacuum) or positive pressure, and both modes are utilized during a complete furnace cycle. At the beginning as well as at the end of each furnace cycle the furnace chamber is allowed to reach ambient atmospheric pressure when opened up for loading and unloading shapes. An example of a Vacuum-Pressure-Transformation furnace is shown in FIG. 5, with the subcomponents individually labeled:

A chamber system 10 capable of withstanding negative pressures and positive inert gas pressures, both while operating at elevated temperatures;

A chamber lid 11 or door that allows the crucible, metal charge, fixture, and preform or composite shapes to be inserted into or removed out of the chamber;

A heating system 13 that is integrated with the chamber, capable of heating metal to a liquid state and then to temperatures of at least 900° C. and higher, plus capable of preheating the preform shapes before being immersed into the liquid metal bath;

A crucible 15, containing the metal 17 for the transformation process;

A vacuum pumping system 19;

An inert gas source and pressurization system 21;

A fixture 23 used to secure the preform/composite shape 25 during processing.

Finally, an optional actuator mechanism 27 used to fully immerse the preform shape into the liquid metal bath and to extract the ceramic-metallic composite shapes out of the liquid metal bath.

Even though the exact configuration of the VPT furnace may be varied, it is the combination of these characteristics that will result in the successful fabrication of ceramic-metallic composites without porosity.

The Vacuum-Pressure-Transformation furnace is designed to achieve specified levels of vacuum pressure (as low as possible) and positive inert gas pressure (as high as possible), but the exact values utilized during processing will be determined by a number of factors, as described below.

While a perfect vacuum is defined as a volume of space entirely devoid of matter, industrial applications utilize partial vacuums whereby some matter is still present. Furthermore, it is more meaningful to define the quality of a vacuum by how closely it approaches a perfect vacuum as measured by partial pressure (less the atmospheric pressure) in units such as torr. With standard atmospheric pressure at 760 torr, the quality of a vacuum is typically grouped as follows: low vacuum (760 to 25 torr), medium vacuum (25 to 0.001 torr), high vacuum ($1\times10^{-3}$ to $1\times10^{-9}$ torr), and ultra-high vacuum ($1\times10^{-9}$ to $1\times10^{-12}$ torr). There are three benefits of applying a vacuum during the initial part of a Vacuum-Pressure-Transformation furnace cycle. The first is the removal of moisture from the chamber, which significantly reduces the amount of dissolved hydrogen in the liquid aluminum. The second is the removal of oxygen from the chamber; oxygen from air and moisture causes the top surface of the liquid aluminum bath to form an oxide layer. This oxide layer, which is also called dross in the prior art, forms a tenacious skin on the top surface of the melt and this skin will increase in thickness with increasing temperature and exposure time to oxygen. The oxide layer is broken up while immersing the preform shape into the liquid bath and fragments can cling to the outside of the shape or infiltrate into the shape, both of which cause potential quality issues in the final product. The use of a vacuum reduces this oxide layer to a minimal thickness. The third benefit is the evacuation of oxygen and moisture from the surfaces of the preform shape as well as the pores within the material, which removes another potential source of hydrogen gas or oxide defects. Therefore, optimizing the use of a vacuum during the initial part of a Vacuum-Pressure-Transformation furnace cycle essentially eliminates the formation of hydrogen gas porosity and dross defects in the final ceramic-metallic composite, and these results are typically achieved by utilizing a medium (25 to 0.001 torr) or high vacuum ($1\times10^{-3}$ $1\times10^{-9}$ torr). The three benefits outlined above can be realized while applying a vacuum in the VPT furnace while the system is at lower temperatures, but as the temperature is raised to 900° C. and above there is the risk that the boiling points of materials inside the VPT furnace are exceeded. For instance, the boiling point of liquid aluminum at 760 torr is 2327° C. but as the vacuum pressure is dropped to 0.1 torr the boiling point drops to 1123° C. In this example, a VPT furnace cycle may utilize a high vacuum such as $1\times10^4$ torr at temperatures below 900° C. but then reduce to a medium vacuum such as 5 torr as the temperature is increased beyond 900° C. Therefore, careful consideration must be given to the boiling points of the materials that are contained within the VPT chamber, as well as the vacuum levels achieved during a VPT furnace cycle.

Finally, the benefit of applying a positive inert gas pressure during and after the shape is extracted from the liquid metal bath in the VPT furnace is to eliminate the formation of centerline porosity during cooling of the shape. When the composite shape is extracted from the liquid metal bath the outside surfaces cool first and possibly faster than the interior region. Therefore the liquid metal located near the outside surfaces inside the composite shape starts solidifying first. Centerline porosity forms because the center region in the composite shape is the last to solidify and there is no ability to backfill this porosity with additional liquid metal. By applying positive inert gas pressure and controlling the rate of cooling, the liquid metal inside the composite shape is allowed to solidify more uniformly while being pushed to the center regions, thereby eliminating the possibility of having centerline porosity form. The present application has found that this benefit can be achieved at positive pressures as low at 0.3 MPa (50 psi) to 6.9 MPa (1000 psi) and higher.

A Vacuum-Pressure-Transformation furnace can be configured to run in two operating modes, as seen in FIGS. 5 through 9.

Figure 6:
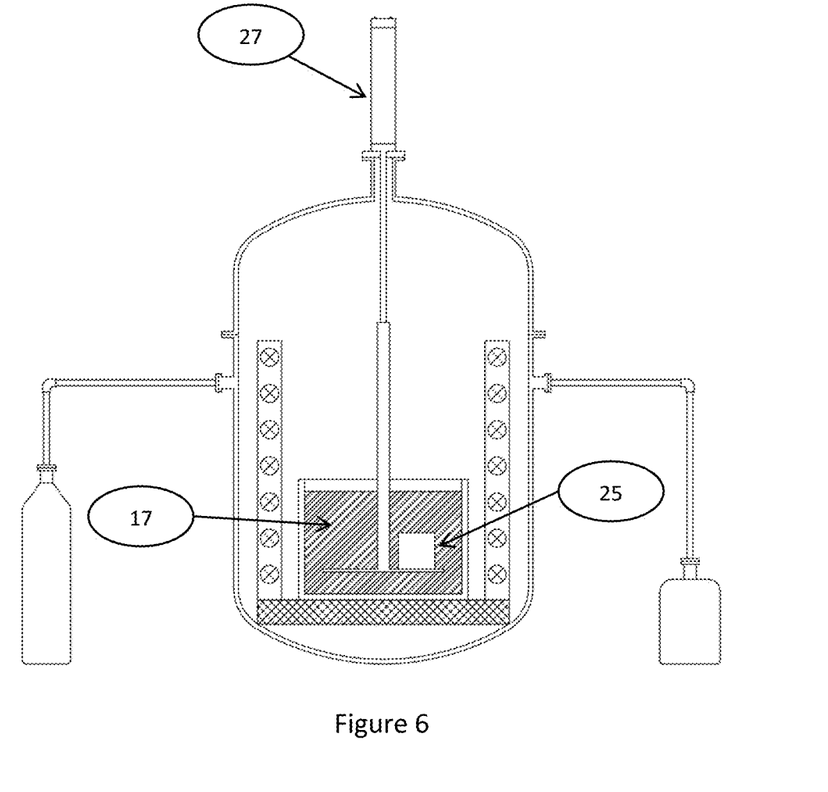
FIG. 6 is a cross-sectional drawing of a Vacuum-Pressure-Transformation furnace with an actuator, with a shape immersed in liquid metal.

The first mode, shown in FIGS. 5 and 6, carries out transformation of a preform shape by utilizing an actuator 27. With this mode the entire process is carried out in one furnace cycle, resulting in ceramic-metallic composites without centerline porosity.

Figure 7:
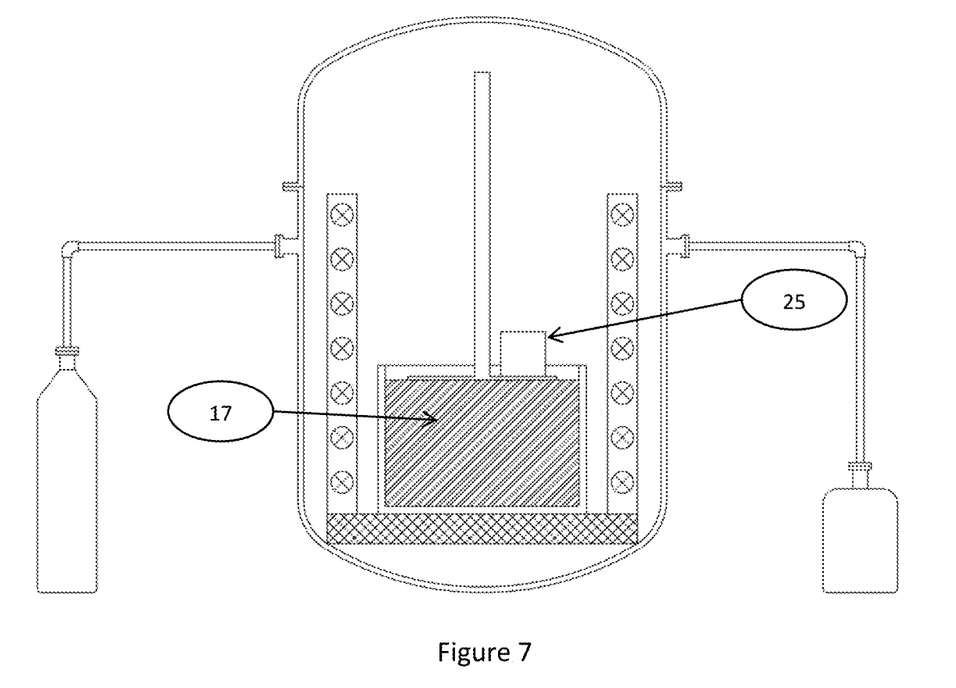
FIG. 7 is a cross-sectional drawing of a Vacuum-Pressure-Transformation furnace without an actuator, with a shape in the preheating position on top of solid metal.
Figure 8:
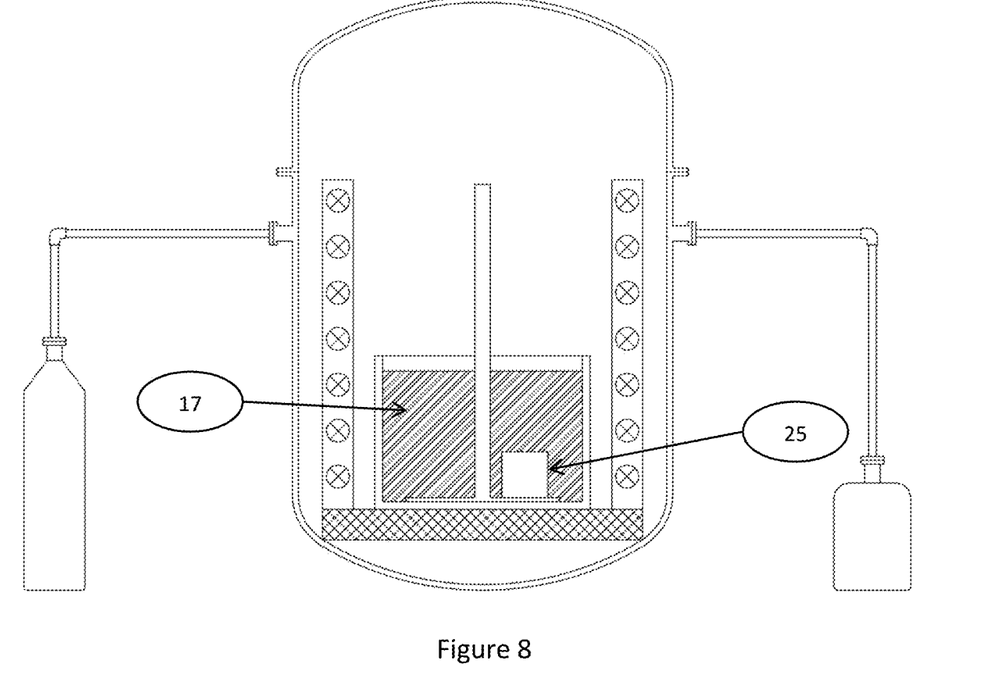
FIG. 8 is a cross-sectional drawing of a Vacuum-Pressure-Transformation furnace without an actuator, with a shape immersed in liquid metal.
Figure 9:
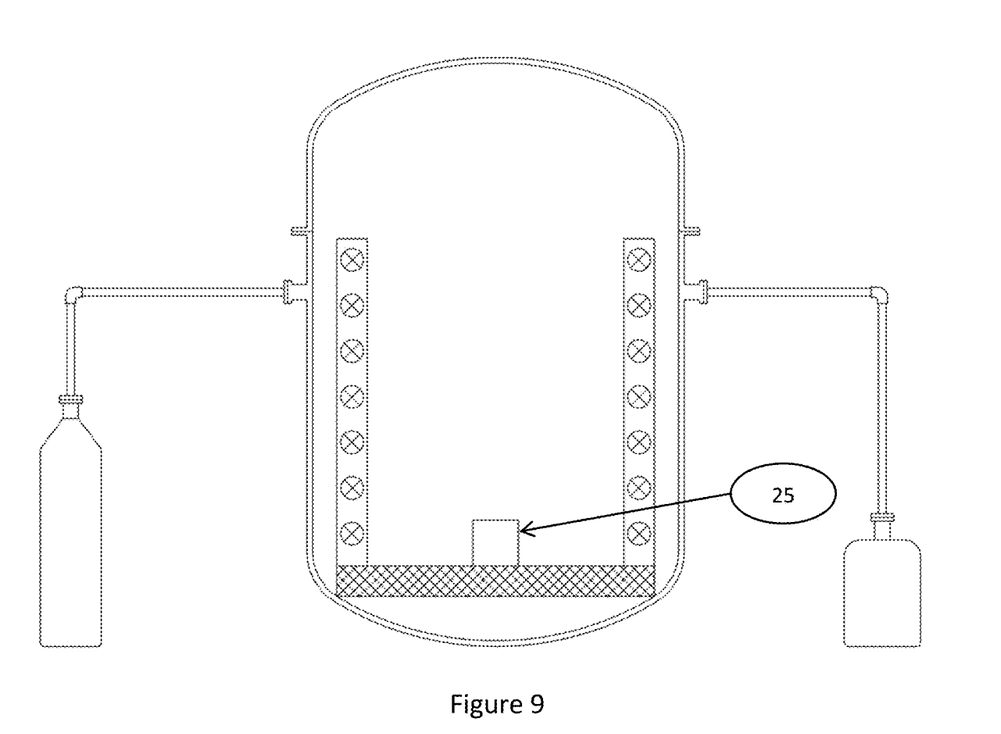
FIG. 9 is a cross-sectional drawing of a Vacuum-Pressure-Transformation furnace without an actuator, with a shape going through a remelting-repressurization treatment cycle.

The second mode, shown in FIGS. 7, 8, and 9, must be carried out in two furnace cycles. In the first cycle transformation of a preform shape 25 is carried without an actuator, as shown in FIGS. 7 and 8. This is followed by the second cycle with a remelting-repressurization treatment on that same composite shape 25, as shown in FIG. 9; the crucible 15 and metal bath 17 are removed and the composite shape 25 is placed back into the furnace chamber.

Both modes will result in a composite shape that does not contain centerline porosity. While the first Vacuum-Pressure-Transformation furnace configuration mode appears to be the most expedient by carrying out the entire process in one furnace cycle, incorporating an actuator in the system presents design and operational challenges since it must withstand both vacuum and high positive pressures while under high temperature conditions. Therefore, operating the VPT furnace in the second configuration mode with two furnace cycles is an alternative.

In the case of the second configuration mode, the first furnace cycle is used to transform the preform material into the ceramic-metallic composite without the use of an actuator. The composite shape stays in the liquid metal bath at the end of the transformation cycle and then removed from the liquid under ambient pressure conditions. Even though the furnace cycle eliminates dissolved hydrogen gas through the use of vacuum pressure, centerline porosity is formed due to the shrinkage of liquid aluminum during solidification and because the center region of the shape is the last to cool. Therefore the second furnace cycle to carry out a remelting-repressurization treatment is necessary in order to eliminate the centerline porosity in the final composite shape when the VPT furnace does not have an actuator.

During the second furnace cycle, the ceramic-metallic composite shape is heated to a temperature just above the melting point of the metal constituent, with the furnace cycle starting off with a negative pressure in order to remove oxygen and moisture from the chamber and then switched over to a positive inert gas pressure in order to complete the cycle. The shape is heated to a high enough temperature and for a long enough time to melt the metal constituent in the composite. By applying positive inert gas pressure and controlling the rate of cooling, the liquid metal inside the composite shape is allowed to solidify more uniformly while being pushed to the center regions, thereby eliminating the possibility of having centerline porosity forming again. After the remelting-repressurization treatment the ceramic-metallic composite material will have improved properties.

As defined by the Metals Handbook Desk Edition, the prior art definition for the term "heat treatment" is "heating and cooling a solid metal or alloy in such a way as to obtain desired conditions or properties". Also, as defined by Metals Handbook Ninth Edition, Volume 15: Casting, the prior art process of "hot isostatic pressing" of solid aluminum alloys is carried out at high inert gas pressures but at temperatures below were incipient melting occurs. In both cases, these prior art processes require the metal shape being processed to remain solid and below the melting point. In contrast, the present invention's use of a remelting-repressurization treatment is unique in that the process is specifically used to eliminate porosity in ceramic-metallic composites by heating the material to a point where the metal constituent in the composite shape is melted as well as through the application of negative and positive pressures.

The minimum processing temperatures utilized in a remelting-repressurization treatment furnace cycle will depend upon the composition of the metal in the ceramic-metallic composite, more specifically the melting point of that metal or metal alloy. For instance, pure aluminum melts at 660° C., when aluminum is alloyed with magnesium the initial melting point is 450° C., and when aluminum is alloyed with silicon the initial melting point is 577° C. Therefore careful consideration needs to be given of the metal alloy composition in the ceramic-metallic composite and the associated liquidus temperature.

None of the benefits discovered by using the Vacuum-Pressure-Transformation furnace are possible with the conventional transformation furnace from the prior art. Through the utilization of the VPT furnace the elimination of porosity in ceramic-metallic composites has a very significant effect on the final material properties. For example, a test bar similar to that shown in FIG. 1 had a three-point flexural strength of 275 MPa or 39,900 psi (per ASTM procedure C 1161) and 1.5 volume % porosity as measured using the Archimedes' principle (per ASTM procedure C 20), while a test bar similar to that shown in FIG. 2 had a three-point flexural strength of 423 MPa or 61,400 psi and no measurable porosity. By eliminating centerline porosity through the use of this unique furnace system, the increased density maximizes the strength of the composites.

The following two embodiments for this invention make significant changes to the final density of the ceramic-metallic composites in the prior art embodiment, resulting in unique composites with lower amounts of porosity and subsequently improved properties over those resulting from the prior art embodiment.

In one preferred embodiment the Vacuum-Pressure-Transformation furnace incorporates an actuator to handle the preform shape during controlled immersion into the liquid metal bath as well as extract the part out of the bath upon completion of the transformation reaction. The configuration of the actuator will vary depending upon a combination of factors including desired complexity and cost, but its function will always be to constrain the shape during immersion and extraction from the liquid metal bath. When using this actuator the VPT furnace cycle is comprised of essentially seven stages.

Stage 1: The preform shape is mounted in a fixture, a crucible containing an aluminum charge is prepared, all are loaded into the VPT furnace while at ambient atmospheric pressure, and the chamber is then closed.

Stage 2: A vacuum is pulled on the chamber while the preform is held by the actuator above the crucible and the heating system preheats the preform shape to a temperature above 900° C. as well as melts the aluminum. Initially a high vacuum ($1\times10^{-3}$ to $1\times10^{-9}$ torr) may be utilized but once the metal is melted and reaches 900° C., the vacuum quality will need to be lowered to a medium vacuum (25 to 0.001 torr), with the final value dependent upon the final hold temperature and the boiling point of the constituents in the melt.

Stage 3: While the chamber is under a vacuum, and the preform shape and aluminum bath are both above 900° C., the preform is fully immersed into the liquid aluminum bath by the actuator.

Stage 4: Shortly after the shape is fully immersed into the liquid aluminum bath, positive inert gas pressure is applied, and the temperature and pressure are held constant until the displacement reaction is fully completed. Argon or helium gas may be utilized at pressure ranging from 0.3 MPa (50 psi) to 6.9 MPa (1000 psi) or higher.

Stage 5: While the chamber is under positive pressure, the shape is fully extracted out of the liquid aluminum bath by the actuator.

Stage 6: While the chamber is under positive pressure, the shape is allowed to cool.

Stage 7: Once the temperature of the shape has dropped below the aluminum solidification temperature, the pressure in the VPT furnace is reduced to the ambient atmospheric pressure, the chamber is opened up, and the ceramic-metallic composite shape is removed. This temperature is 660° C. for pure aluminum or at lower temperatures for aluminum alloys, dependent upon the alloying elements. The final composite material has no centerline porosity and improved properties.

In a second preferred embodiment the Vacuum-Pressure-Transformation furnace does not incorporate an actuator to handle the preform shape into or out of the liquid metal bath. Because this prevents the application of pressure after the shape is extracted from the bath, the shape must be run again through a second VPT furnace cycle. In this embodiment the first VPT furnace cycle is comprised of essentially six stages.

Stage 1: A solid aluminum charge is loaded into a crucible, the preform shape is mounted in a fixture and then placed on top of the solid aluminum, the entire assembly is loaded into the VPT furnace while at ambient atmospheric pressure, and then the chamber is closed.

Stage 2: A vacuum is pulled on the chamber and the heating system heats the preform shape and aluminum to a temperature above 900° C. Initially a high vacuum ($1\times10^{-3}$ to $1\times10^{-9}$ torr) may be utilized but once the metal is melted and reaches 900° C., the vacuum quality will need to be lowered to a medium vacuum (25 to 0.001 torr), with the final value dependent upon the final hold temperature and the boiling point of the constituents in the melt.

Stage 3: While the chamber is under a vacuum and when the aluminum has melted, the fixtured preform fully immerses itself into the liquid aluminum bath by the force of gravity. The melting temperature of the metal is 660° C. for pure aluminum or at lower temperatures for aluminum alloys, dependent upon the alloying elements.

Stage 4: Once the VPT furnace has reached a temperature above 900° C., positive inert gas pressure is applied, and the temperature and pressure are held constant until the displacement reaction is fully completed. Argon or helium gas may be utilized at pressure ranging from 0.3 MPa (50 psi) to 6.9 MPa (1000 psi) or higher.

Stage 5: While the chamber is under positive pressure, the shape is allowed to cool to a temperature just above the aluminum solidification temperature. Again, this temperature is above 660° C. for pure aluminum or at lower temperatures for aluminum alloys.

Stage 6: While holding the VPT furnace temperature just above the aluminum solidification temperature, the pressure in the chamber is reduced to the ambient atmospheric pressure, the chamber is opened up, the ceramic-metallic composite shape is extracted from the liquid metal bath, and the crucible is removed from the furnace.

After the first VPT furnace cycle, the ceramic-metallic shape must be run through a second VPT furnace cycle in order to eliminate the centerline porosity through a remelting-repressurization treatment. This second VPT furnace cycle is comprised of essentially seven stages.

Stage 1: The composite shape is loaded into the empty VPT furnace while at ambient atmospheric pressure and the chamber is then closed.

Stage 2: A vacuum is pulled on the chamber and then the heating system begins to heat the composite shape. A medium vacuum (25 to 0.001 torr) or high vacuum ($1\times10^{-3}$ to $1\times10^{-9}$ torr) may be utilized.

Stage 3: Before the metal in the composite reaches its melting temperature, a positive pressure is applied by utilizing an inert gas such as argon or helium. This temperature is 660° C. for pure aluminum or at lower temperatures for aluminum alloys, dependent upon the alloying elements. The inert gas may be utilized at pressure ranging from 0.3 MPa (50 psi) to 6.9 MPa (1000 psi) or higher.

Stage 4: While the positive inert gas pressure is applied, the heating system increases the temperature of the shape to a point above the melting temperature of the metal in the composite.

Stage 5: While the chamber is under positive pressure, the temperature and pressure are held constant until all the porosity is removed from the composite shape.

Stage 6: The shape is allowed to cool while the chamber is under positive pressure.

Stage 7: Once the temperature of the shape has dropped below the aluminum solidification temperature, the pressure in the VPT furnace is reduced to the ambient atmospheric pressure, the chamber is opened up, and the final ceramic-metallic composite shape is removed. This temperature is 660° C. for pure aluminum or at lower temperatures for aluminum alloys, dependent upon the alloying elements. The final composite material has no centerline porosity and improved properties.

The following are examples of these preferred embodiments of the present invention.

Example 1

A preform test bar shape containing 36 weight % silicon dioxide ($SiO_2$) and 64 weight % silicon carbide (SiC) was conventionally fabricated. The preform shape and a crucible containing an alloy of 80 weight % aluminum and 20 weight % silicon were loaded into the Vacuum-Pressure-Transformation furnace. The VPT furnace was then closed and a high vacuum of $1\times10^{-4}$ torr was pulled on the chamber. While under this negative pressure the preform was held by an actuator above the crucible, and the heating system preheated the preform shape to a temperature of 900° C. and melted the Al—Si alloy. When 900° C. was reached, vacuum was reduced to a medium vacuum of 5 torr. Once the preform shape and aluminum alloy were both heated to 1200° C. the preform was fully immersed into the liquid Al—Si bath by the actuator while under this negative pressure. Shortly after the shape was fully immersed into the liquid metal bath, a positive inert argon gas pressure was applied. The temperature was held at 1200° C. and the pressure was held at 5.0 MPa (725 psi) for 90 minutes. Transformation was completed in that time, achieving a rate of 8.5 mm per hour. While the chamber was kept at this positive pressure the shape was fully extracted out of the liquid aluminum bath by the actuator and then allowed to cool to below 450° C. After the pressure in the VPT furnace was reduced to ambient atmospheric pressure, the chamber was opened up and the SiC—$Al_2O_3$—Al ceramic-metallic composite shape was removed. The test bar was measured for flexural strength and apparent porosity per ASTM standards C1161 and C20: the three-point flexural strength was 423 MPa (61,400 psi) and the apparent porosity was zero. The final composite material had no centerline porosity as determined by measuring its density and a structure similar to that seen in FIGS. 2 and 4.

Example 2

Two preform test bar shapes containing 36 weight % $SiO_2$ and 64 weight % SiC were conventionally fabricated. The preform shapes were mounted in a fixture and placed on top of a crucible containing a solid alloy of 80 weight % Al and 20 weight % Si, all at room temperature. The crucible and fixture assembly were loaded into the Vacuum-Pressure-Transformation furnace. The VPT furnace was closed and a high vacuum of $1\times10^{-4}$ torr was pulled on the chamber. While under this negative pressure the preform shapes and Al—Si alloy were heated to a temperature of 900° C. At some point above 577° C., the Al alloy melted and the fixture and two preform shapes were fully immersed into the liquid metal bath by the force of gravity. When 900° C. was reached, vacuum was reduced to a medium vacuum of 5 torr. Once the alloy bath reached 1200° C., a positive inert argon gas pressure of 7.0 MPa (1015 psi) was applied for 90 minutes. While the chamber was kept at this positive pressure the liquid metal was then allowed to cool to 700° C. or above its temperature of solidification. At that point the pressure in the VPT furnace was reduced to ambient atmospheric pressure, the chamber was opened up, the fixture was extracted from the liquid metal bath, the SiC—$Al_2O_3$—Al ceramic-metallic composite shapes were extracted from the fixture, and the crucible was removed from the furnace. One test bar was set aside and left as is, while the second test bar was run through a second VPT furnace cycle furnace cycle for a remelting-repressurization treatment. That composite shape was loaded into the VPT furnace (after removing the crucible and metal) while at ambient atmospheric pressure and the chamber was then closed. A high vacuum of $1\times10^{-4}$ torr was pulled on the chamber and then the furnace began heating the composite shape. The negative pressure was held until the shape reached 400° C. and then a positive inert argon gas pressure of 7.0 MPa (1015 psi) was applied. Heating continued until the shape reached 700° C. and then the test bar was held at that temperature for 90 minutes. While still being held under the positive pressure, the temperature of the shape was allowed to drop to 400° C. At that point the pressure in the VPT furnace was reduced to the ambient atmospheric pressure, the chamber was opened up, and the final ceramic-metallic composite shape is removed. Both test bars were measured for flexural strength and apparent porosity per ASTM standards C1161 and C20. The test bar that was only run through the VPT furnace had a three-point flexural strength of 275 MPa (39,900 psi), 1.5 volume % apparent porosity, and centerline porosity similar to that seen in FIGS. 1 and 3. In contrast, the test bar that was run through the VPT furnace twice had a three-point flexural strength of 420 MPa (61,000 psi), an apparent porosity of zero as determined by measuring density, and no centerline porosity with a structure similar to that seen in FIGS. 2 and 4.

Example 3

A preform rod shape containing silicon dioxide ($SiO_2$) was conventionally fabricated. The preform shape and a crucible containing commercially pure aluminum were loaded into the Vacuum-Pressure-Transformation furnace. The VPT furnace was then closed and a high vacuum of $1\times10^{-4}$ torr was pulled on the chamber. While under this negative pressure the preform was held by an actuator above the crucible, and the heating system preheated the preform shape to a temperature of 900° C. and melted the aluminum. When 900° C. was reached, vacuum was reduced to a medium vacuum of 5 torr. Once the preform shape and aluminum alloy were both heated to 1200° C. the preform was fully immersed into the liquid Al bath by the actuator while under this negative pressure. Shortly after the shape was fully immersed into the liquid metal bath, a positive inert argon gas pressure was applied. The temperature was held at 1200° C. and the pressure was held at 5.0 MPa (725 psi) for 90 minutes. While the chamber was kept at this positive pressure the shape was fully extracted out of the liquid aluminum bath by the actuator and then allowed to cool to below 600° C. After the pressure in the VPT furnace was reduced to ambient atmospheric pressure, the chamber was opened up and the $Al_2O_3$—Al ceramic-metallic composite shape was removed. The final composite material had no centerline porosity as determined by measuring density.

Example 4

A preform rod shape containing $SiO_2$ was conventionally fabricated. The preform shape and a crucible containing an alloy of 60 weight % aluminum and 40 weight % silver (Ag) were loaded into the Vacuum-Pressure-Transformation furnace. The VPT furnace was then closed and a high vacuum of $1\times10^{-4}$ torr was pulled on the chamber. While under this negative pressure the preform was held by an actuator above the crucible, and the heating system preheated the preform shape to a temperature of 900° C. and melted the aluminum alloy. When 900° C. was reached, vacuum was reduced to a medium vacuum of 10 torr. Once the preform shape and alloy were both heated to 1200° C. the preform was fully immersed into the liquid Al—Ag bath by the actuator while under this negative pressure. Shortly after the shape was fully immersed into the liquid metal bath, a positive inert argon gas pressure was applied. The temperature was held at 1200° C. and the pressure was held at 6.9 MPa (1000 psi) for 90 minutes. While the chamber was kept at this positive pressure the shape was fully extracted out of the liquid aluminum alloy bath by the actuator and then allowed to cool to below 550° C. After the pressure in the VPT furnace was reduced to ambient atmospheric pressure, the chamber was opened up and the $Al_2O_3$—Al—Ag ceramic-metallic composite shape was removed. The final composite material had no centerline porosity as determined by measuring density.

Example 5

A preform rod shape containing $SiO_2$ was conventionally fabricated. The preform shape and a crucible containing an alloy of 85 weight % aluminum and 15 weight % iron (Fe) were loaded into the Vacuum-Pressure-Transformation furnace. The VPT furnace was then closed and a high vacuum of $1\times10^{-4}$ torr was pulled on the chamber. While under this negative pressure the preform was held by an actuator above the crucible, and the heating system preheated the preform shape to a temperature of 900° C. and melted the aluminum alloy. When 900° C. was reached, vacuum was reduced to a medium vacuum of 7.5 torr. Once the preform shape and alloy were both heated to 1200° C. the preform was fully immersed into the liquid Al—Fe bath by the actuator while under this negative pressure. Shortly after the shape was fully immersed into the liquid metal bath, a positive inert argon gas pressure was applied. The temperature was held at 1200° C. and the pressure was held at 5.0 MPa (725 psi) for 90 minutes. While the chamber was kept at this positive pressure the shape was fully extracted out of the liquid aluminum alloy bath by the actuator and then allowed to cool to below 650° C. After the pressure in the VPT furnace was reduced to ambient atmospheric pressure, the chamber was opened up and the $Al_2O_3$—Al—Fe ceramic-metallic-intermetallic composite shape was removed. The final composite material had no centerline porosity as determined by measuring density.

The invention claimed is:

1. A method of manufacturing ceramic-metallic composites substantially devoid of centerline porosity, including the steps of:
    a) providing a vacuum-pressure-transformation (VPT) furnace comprising:
        i) a chamber having an access door;
        ii) a crucible within said chamber;
        iii) a source of inert gas connected to said chamber and a pressurization system for selectively pressurizing said chamber with said inert gas;
        iv) a vacuum pumping system connected to said chamber and selectively operable to evacuate said chamber; and
        v) a heating system operable to selectively heat said chamber;
    b) adding a charge of aluminum or an aluminum alloy into said crucible;
    c) placing a preform into said chamber above said crucible, said preform having unenclosed sides directly exposed to an interior of said chamber;
    d) operating said vacuum pumping system to establish a partial vacuum within said chamber;
    e) during partial vacuum status of said chamber, operating said heating system to raise chamber temperature above a melting point of said charge, whereby said charge is melted with said preform being heated to substantially the same temperature as said charge;
    f) immersing said preform into said melted charge within said crucible;
    g) operating said pressurization system to pressurize said chamber with said inert gas to a pressure greater than 50 psi;
    h) maintaining temperature and pressure constant until a displacement reaction has been completed;
    i) reducing temperature in said chamber while maintaining positive pressure within said chamber and extracting a now ceramic-metallic composite shape from said crucible; and
    j) allowing said composite shape to cool under positive pressure; and
    k) removing said ceramic-metallic composite shape from said chamber, said composite shape being substantially devoid of centerline porosity.

2. The method of claim 1, wherein said placing step includes the step of mounting said preform in a fixture.

3. The method of claim 1, wherein said inert gas is chosen from the group consisting of argon and helium.

4. The method of claim 2, wherein said fixture is placed on an actuator.

5. The method of claim 4, wherein said immersing step includes the step of operating said actuator to lower said preform into said crucible.

6. The method of claim 1, wherein said immersing step comprises lowering said preform into said crucible by force of gravity.

7. The method of claim 1, wherein said step of operating said vacuum pumping system comprises first evacuating said chamber to a pressure of $1 \times 10^{-3}$ to $1 \times 10^{-9}$ torr until said charge within said crucible is melted, then increasing pressure to about 0.001 to 25 torr.

8. The method of claim 1, wherein said step of operating said pressurization system comprises pressurizing said chamber to a pressure of 50 to 1000 psi.

9. The method of claim 1, wherein said method being conducted at a reaction rate of at least 8.5 mm/hr.

10. The method of claim 1, wherein said heating system is operated to raise temperature of said chamber to above 900° C.

11. The method of claim 1, wherein said ceramic-metallic composite shape is extracted from said crucible above a melting point of aluminum.

12. The method of claim 11, wherein:
   a) said crucible is removed from said chamber and said ceramic-metallic composite shape is re-inserted into said chamber;
   b) said vacuum pumping system is activated to reduce chamber pressure to no greater than 25 torr;
   c) heating said chamber to just below a melting point of said shape and activating said pressurization system to flow inert gas into said chamber to a pressure of at least 50 psi;
   d) increasing chamber temperature to above a melting temperature of metal in said shape;
   e) maintaining substantially constant temperature until substantially all porosity is removed from said shape;
   f) cooling said shape within said chamber under positive pressure; and
   g) removing said shape from said chamber.

13. The method of claim 12, wherein said inert gas is chosen from the group consisting of argon and helium.

14. The method of claim 12, wherein said pressure is 50 to 1000 psi.

15. The method of claim 12, wherein prior to said removing step recited in claim 12, subparagraph g), temperature within said chamber is maintained above aluminum solidification temperature.

16. The method of claim 15, wherein prior to said removing step recited in claim 12, subparagraph g), pressure in said chamber is reduced to ambient atmospheric pressure.

17. A method of manufacturing ceramic-metallic composites substantially devoid of centerline porosity, including the steps of:
   a) providing a vacuum-pressure-transformation (VPT) furnace comprising:
      i) a chamber having an access door;
      ii) a crucible within said chamber;
      iii) a source of inert gas connected to said chamber and a pressurization system for selectively pressurizing said chamber with said inert gas;
      iv) a vacuum pumping system connected to said chamber and selectively operable to evacuate said chamber; and
      v) a heating system operable to selectively heat said chamber;
   b) adding an aluminum charge into said crucible;
   c) placing a preform into said chamber above said crucible in a fixture on an actuator, said preform having unenclosed sides directly exposed to an interior of said chamber;
   d) operating said vacuum pumping system to establish a partial vacuum within said chamber;
   e) during partial vacuum status of said chamber, operating said heating system to raise chamber temperature above 900° C., whereby said aluminum charge is melted with said preform being heated to substantially the same temperature as said charge;
   f) operating said actuator to immerse said preform into liquid aluminum within said crucible;
   g) operating said pressurization system to pressurize said chamber with said inert gas chosen from the group consisting of argon and helium, to a pressure greater than 50 psi;
   h) maintaining temperature and pressure constant until a displacement reaction has been completed;
   i) reducing temperature in said chamber while maintaining positive pressure within said chamber and operating said actuator to extract a now ceramic-metallic composite shape from said crucible;
   j) allowing said composite shape to cool under positive pressure; and
   k) removing said ceramic-metallic composite shape from said chamber, said composite shape being substantially devoid of centerline porosity.

18. The method of claim 17, wherein said immersing step includes the step of operating said actuator to lower said preform into said crucible.

19. The method of claim 17, wherein said step of operating said vacuum pumping system comprises first evacuating said chamber to a pressure of $1 \times 10^{-3}$ to $1 \times 10^{-9}$ torr until said aluminum within said crucible is melted, then increasing pressure to about 0.001 to 25 torr.

20. The method of claim 17, wherein said method being conducted at a reaction rate of at least 8.5 mm/hr.

21. A method of manufacturing ceramic-metallic composites substantially devoid of porosity, including the steps of:
   a) providing a vacuum-pressure-transformation (VPT) furnace comprising:
      i) a chamber having an access door;
      ii) a crucible within said chamber;
      iii) a source of inert gas connected to said chamber and a pressurization system for selectively pressurizing said chamber with said inert gas;
      iv) a vacuum pumping system connected to said chamber and selectively operable to evacuate said chamber; and
      v) a heating system operable to selectively heat said chamber;
   b) adding a charge of aluminum or an aluminum alloy into said crucible;
   c) placing a preform into said chamber above said crucible;
   d) operating said vacuum pumping system to establish a partial vacuum within said chamber;
   e) operating said heating system to raise chamber temperature above a melting point of said charge, whereby said charge is melted;
   f) immersing said preform into said melted charge within said crucible;
   g) operating said pressurization system to pressurize said chamber with said inert gas to a pressure greater than 50 psi;
   h) maintaining temperature and pressure constant until a displacement reaction has been completed;
   i) reducing temperature in said chamber while maintaining positive pressure within said chamber and extracting a now ceramic-metallic composite shape from said crucible above a melting point of aluminum;
j) allowing said composite shape to cool under positive pressure;
k) removing said ceramic-metallic composite shape from said chamber;
l) said crucible being removed from said chamber and said ceramic-metallic composite shape being re-inserted into said chamber;
m) said vacuum pumping system being activated to reduce chamber pressure to no greater than 25 torr;
n) heating said chamber to just below a melting point of said shape and activating said pressurization system to flow inert gas into said chamber to a pressure of at least 50 psi;
o) increasing chamber temperature to above a melting temperature of metal in said shape;
p) maintaining substantially constant temperature until substantially all porosity is removed from said shape;
q) cooling said shape within said chamber under positive pressure; and
r) removing said shape from said chamber.

* * * * *